US011549798B2

(12) United States Patent
Strebel

(10) Patent No.: US 11,549,798 B2
(45) Date of Patent: Jan. 10, 2023

(54) MEASURING DEVICE FOR DETERMINING A DISTANCE BETWEEN A LASER PROCESSING HEAD AND A WORKPIECE, LASER PROCESSING SYSTEM INCLUDING THE SAME AND METHOD FOR DETERMINING A DISTANCE BETWEEN A LASER PROCESSING HEAD AND A WORKPIECE

(71) Applicant: PRECITEC GMBH & CO. KG, Gaggenau (DE)

(72) Inventor: Matthias Strebel, Gaggenau (DE)

(73) Assignee: PRECITEC GMBH & CO. KG, Gaggenau (DE)

( * ) Notice: Subject to any disclaimer, the term of this patent is extended or adjusted under 35 U.S.C. 154(b) by 587 days.

(21) Appl. No.: 16/524,445

(22) Filed: Jul. 29, 2019

(65) Prior Publication Data

US 2020/0041249 A1    Feb. 6, 2020

(30) Foreign Application Priority Data

Jul. 31, 2018   (DE) ..................... 10 2018 118 501.4

(51) Int. Cl.
*G01B 9/02* (2022.01)
*G01B 9/02091* (2022.01)
(Continued)

(52) U.S. Cl.
CPC ........ *G01B 9/02091* (2013.01); *B23K 26/032* (2013.01); *B23K 26/048* (2013.01); *B23K 26/21* (2015.10); *G01B 9/02028* (2013.01)

(58) Field of Classification Search
CPC .............. G01B 9/0209; G01B 9/02091; G01B 9/02028; B23K 26/21; B23K 26/032; B23K 26/048
See application file for complete search history.

(56) References Cited

U.S. PATENT DOCUMENTS

| 6,198,540 B1 * | 3/2001 | Ueda .................. G01N 21/4795 356/497 |
| 6,775,007 B2 | 8/2004 | Izatt et al. |
| 2006/0103850 A1 * | 5/2006 | Alphonse ............. A61B 5/0066 356/479 |

(Continued)

FOREIGN PATENT DOCUMENTS

| DE | 102013008269 A1 | 11/2014 |
| DE | 102017128158 A1 | 6/2018 |

(Continued)

*Primary Examiner* — Tarifur R Chowdhury
*Assistant Examiner* — Jonathon Cook
(74) *Attorney, Agent, or Firm* — Dinsmore & Shohl LLP

(57) ABSTRACT

A measuring device determines a distance between a processing head for a laser processing system configured to process a workpiece with a laser beam and the workpiece. The measuring device includes an optical coherence tomograph to measure a distance between the processing head and workpiece. In the optical coherence tomograph, measuring light generated by a measuring light source and reflected by the workpiece interferes with measuring light reflected in a reference arm with two or more reference stages. The stages include a first reference stage configured such that the measuring light reflected therein travels a first optical path length, and a second reference stage configured such that the measuring light reflected therein travels a second optical path length different from the first length, wherein the measuring light reflected by the workpiece interferes with reflected measuring light of the first reference stage and reflected measuring light of the second reference stage.

11 Claims, 3 Drawing Sheets

(51) Int. Cl.
*G01B 9/02015* (2022.01)
*B23K 26/21* (2014.01)
*B23K 26/04* (2014.01)
*B23K 26/03* (2006.01)

(56) References Cited

U.S. PATENT DOCUMENTS

| | | | |
|---|---|---|---|
| 2008/0297806 A1* | 12/2008 | Motaghiannezam | ................... G01B 9/02004 356/484 |
| 2010/0118292 A1* | 5/2010 | Park | ................... G01B 9/02028 356/482 |
| 2013/0003075 A1* | 1/2013 | Kusumoto | ......... G01B 9/02028 356/479 |
| 2013/0286400 A1* | 10/2013 | Kim | ................... G01B 9/04 356/450 |
| 2016/0039045 A1 | 2/2016 | Webster | |
| 2017/0120337 A1* | 5/2017 | Kanko | ................. B23K 31/125 |

FOREIGN PATENT DOCUMENTS

| | | |
|---|---|---|
| EP | 2535680 A1 | 12/2012 |
| JP | 2010104514 A | 5/2010 |
| JP | 2011528801 A | 11/2011 |

* cited by examiner

MEASURING DEVICE FOR DETERMINING A DISTANCE BETWEEN A LASER PROCESSING HEAD AND A WORKPIECE, LASER PROCESSING SYSTEM INCLUDING THE SAME AND METHOD FOR DETERMINING A DISTANCE BETWEEN A LASER PROCESSING HEAD AND A WORKPIECE

CROSS-REFERENCE TO RELATED APPLICATION

This application claims priority from German Application No. DE 10 2018 118 501.4 filed Jul. 31, 2018, the entire content of which is incorporated herein by reference.

FIELD OF THE INVENTION

The present disclosure relates to a measuring device for determining a distance between a laser processing head and a workpiece, a laser processing system therewith configured to process a workpiece with a laser beam, and a method for processing a workpiece with a laser beam, in particular a method for determining a distance between a laser processing head and a workpiece. In particular, the present disclosure relates to an optical coherence tomograph for measuring distances to the workpiece having an increased measuring range.

BACKGROUND OF THE INVENTION

In a device for processing materials by means of a laser, e.g., in a laser processing head for laser welding or laser cutting, the laser beam exiting from a laser light source or an end of a laser fiber is focused or concentrated on the workpiece to be processed by means of beam-guiding and focusing optics. Conventionally, a laser processing head with collimating optics and focusing optics is used, wherein the laser light is supplied via an optical fiber.

In laser material processing, optical coherence tomography (OCT) may be used to measure various process parameters such as the distance to the workpiece during laser cutting, the edge position in advance, and the welding depth during welding, and/or the surface topography in the follow-up. For this purpose, measuring light such as an OCT measuring beam can be directed onto the workpiece. Optionally, the OCT measuring beam may be moved over the workpiece to be machined, for example, by means of reflection at least one movable mirror.

For a precise distance measurement, an exact positioning of the optical measuring beam is required. Known technical solutions for precisely positioning an optical measuring beam during laser welding are based, for example, on camera-based methods for determining the measuring beam position relative to the laser beam. These methods are based on an indirect determination of the optimal position of the measuring beam, which is needed, for example, for the welding depth measurement. However, the optimal position of the measuring beam for a reliable welding depth measurement is dependent on different process parameters such as the feed rate and the welding material and therefore cannot be determined with sufficient precision by means of the indirect methods for determining the position.

Known methods for increasing the measuring range of an OCT measuring system, as described for example in DE 10 2013 008 269 A1, are based on the synchronous adjustment of the optical path length in the reference arm, for example, depending on a change in the current processing range of the laser focus at a scanner processing optics. The adjustment is made by a mechanical change of the optical path length of the reference arm, e.g., by deflecting the OCT measuring beam my means of a scanner mirror or by changing the position of an end mirror or prism on a linear axis. Disadvantages of these methods are a very complex control of the described mechanism, since the mechanism must assume an associated position or angular position for each possible adjustment of the laser focus of the processing optics.

SUMMARY OF THE INVENTION

It is an object of the present disclosure to provide a measuring device for determining a distance between a laser processing head and a workpiece, a laser processing system configured to process a workpiece with a laser beam, and a method for processing a workpiece by means of a laser beam, in particular a method for determining a distance between a laser processing head and a workpiece, allowing for a precise and error-free distance measurement to a workpiece. In particular, it is an object of the present disclosure to provide a measuring device with an increased measuring range of an OCT measuring system having reduced complexity.

This object is solved by the subject matter disclosed herein. Advantageous developments of the invention are also disclosed.

According to an aspect of the present disclosure, a measuring device for determining a distance between a laser processing head and a workpiece is provided. The measuring device comprises an optical coherence tomograph configured to determine a distance between the processing head and the workpiece. The optical coherence tomograph comprises a measuring arm for guiding measuring light reflected from the workpiece and a reference arm with two or more reference stages having different optical path lengths. The measuring device further comprises an evaluation unit configured to determine the distance based on a superposition of measuring light from the measuring arm and measuring light from the reference arm.

According to an aspect of the present disclosure, a laser processing system configured to process a workpiece with a laser beam is provided. The laser processing system includes a processing head such as a laser cutting or laser welding head and an optical coherence tomograph configured to measure a distance between the processing head and the workpiece, e.g., a position on or in the workpiece, wherein, in the coherence tomograph, measuring light reflected by the workpiece interferes with measuring light reflected in a reference arm with two or more reference stages. The two or more reference stages comprise a first reference stage configured such that the measuring light reflected in the first reference stage travels a first optical path length, and a second reference stage configured such that the measuring light reflected in the second reference stage travels a second optical path length different from the first optical path length. The measuring light reflected by the workpiece is superimposed with the reflected measuring light of the first and second reference stage, allowing the distance to be determined. Due to the superposition, the measuring light reflected by the workpiece can interfere with measuring light of a corresponding reference arm. For example, the distance to a bottom of the cut and/or to a workpiece surface or a cut depth can be determined.

According to the invention, the measuring light of the OCT sensor system in the reference arm is divided into two or more optical paths (reference stages) which have different optical lengths. An advantage of this arrangement is that, due to the coherence length, the measuring light from the measuring arm automatically interferes with the portion of the measuring light of the reference stage of the reference arm having the appropriate optical path length. In particular, this is the case when all reference stages are uniformly illuminated at all times. This eliminates a synchronous and thus complex control of a mechanical element in the reference arm which is used in the previously known conventional solutions.

Another advantage of the invention is that there is no time offset due to the reference arm between successive measurements. In a remote processing system, for example, it may happen that the position of the processing laser on the component is changed in a very short time by a deflection via the scanner mirrors. Even in case of such rapid changes, the subject matter according to the invention can ensure a distance measurement without gaps, since the measuring light from the measuring arm (or the scanner) automatically interferes with the appropriate measuring light of a reference stage of the reference arm. This cannot be achieved by conventional techniques based on mechanical adaptation of the length of the reference arm due to excessive switching times.

The measuring light or the (optical) measuring beam may be generated by a light source of the coherence tomograph. The coherence tomograph may include an evaluation unit having a detector or sensor configured to detect a superposition of the measuring light reflected in the measuring arm and the reference arm and to determine the distance between the processing head and the workpiece from the interference.

The first reference stage may have a first optical path length covering a first distance range. The second reference stage may have a second optical path length covering a second distance range. The first optical path length may be smaller than the second optical path length. The first and second distance ranges are offset from each other, but may overlap. For example, the first distance range may contain smaller values than the second distance range. The distance ranges may have the same size. The distance ranges may correspond to a measuring range of the coherence tomograph which depends on the coherence length of the measuring light. For example, the measuring range of the coherence tomograph may be approximately 16 mm.

Preferably, the reference stage from which the light interferes with the measuring light reflected from the workpiece for distance determination is known. When light from the second reference stage interferes with the measuring light reflected from the workpiece and a measured value is determined therefrom, an evaluation unit may thus be configured to add a predetermined offset corresponding to the second distance range to the measured value in order to determine the distance. For example, an initial distance and the corresponding reference stage may be known and a change in distance may be tracked. Alternatively or in addition, the evaluation unit may be configured to determine, e.g., by means of a sensor for capacitive or inductive distance measurement, in which distance range the distance to be measured falls and which reference stage corresponds to this distance range. However, the evaluation unit may also obtain position data of the processing head from a robot arm controller or position data of one or more scan mirrors from a scanner controller, and may determine the relevant distance range and the corresponding reference stage therefrom.

Preferably, the optical coherence tomograph includes a beam splitter assembly for dividing the measuring light into the two or more reference stages. In particular, the beam splitter arrangement may be configured to divide the measuring light between the two or more reference stages into substantially equal portions, i.e., with equal intensity. For example, the measuring light in the reference arm is divided into equal portions between the respective path lengths. For two reference stages, the intensity of the measuring light may be 50%, for three reference stages 33%, and so on. As a result, in a distance measurement, the OCT signal qualities are identical for all reference stages.

Preferably, the beam splitter assembly comprises at least one element selected from the group consisting of a reflecting mirror, a partially transmissive mirror, a prism assembly and an optical fiber coupler. The optical fiber coupler may be configured to split the incoming light from a fiber between at least two fibers. The beam splitter assembly may comprise multiple copies of one of these elements or any combination of the elements.

According to an embodiment, the division of the measuring light between the respective reference stages is based on a free beam, which is partially reflected by a semi-transmissive optical element, e.g., a semi-transmissive mirror or prism, respectively. For example, the two or more reference stages are arranged sequentially, wherein the beam splitter assembly includes a reflective end mirror at a last reference stage of the two or more reference stages and a semi-transmissive optical element at at least one, and in particular each, of the remaining reference stages. Thus, the measuring beam may be split by the semi-transmissive optical element such that measuring light can enter the respective reference stage or be reflected by the semi-transmissive optical element to the following reference stage.

In another embodiment, the division of the measuring light may be implemented by means of fiber technology. One possible implementation is to concatenate a plurality of fiber portions (or fiber sections) with fiber connectors (or fiber couplers) arranged such that the measuring light is provided to the respective reference stages. In particular, the beam splitter assembly may comprise a plurality of successive fiber sections, wherein the measuring light for each reference stage is provided by a respective fiber section.

Preferably, the optical path lengths of all reference stages of the two or more reference stages are different. In particular, the optical path lengths of all reference stages may differ by the same path length difference. In other words, the corresponding distance ranges of all referential stages may have the same size but are shifted to different values. The optical path length may successively increase or decrease by the same path length difference from a first reference stage to a last reference stage. In particular, the path length differences between adjacent reference stages may be identical.

In some embodiments, the optical coherence tomograph has a basic measuring range that depends on the coherence length of the measuring light. In this case, the basic measuring range corresponds to a distance range maximally measurable with one reference stage. A path length difference between the first optical path length and the second optical path length may be less than or equal to the basic measuring range, preferably 70% to 100% of the basic measuring range. For example, the difference in the optical path length between two adjacent reference stages may be chosen such that it corresponds approximately to the basic measuring range of the OCT sensor. Alternatively, there may be a small overlap region, i.e., the path length difference is slightly smaller than the basic measuring range of the sensor. This ensures that, in the case of a continuous change in distance of a measuring object in the measuring arm, a stable OCT interference signal arises from the subsequent reference stage before the interference signal of the preceding reference stage disappears.

According to another aspect of the present disclosure, a method for a laser processing head for processing a workpiece with a laser beam, in particular a method for determining a distance between a laser processing head and a workpiece is provided. The method comprises directing measuring light of an optical coherence tomograph onto the workpiece and into two or more reference stages of a reference arm, wherein optical path lengths of the measuring light in the two or more reference stages are different, superimposing the measuring light reflected from the workpiece with the measuring light reflected in the two or more reference stages, and determining a distance between the processing head and the workpiece based on the superposition.

The method may be implemented by the processing head of the present disclosure. In addition, the processing head may be configured to perform the method according to the present disclosure.

BRIEF DESCRIPTION OF THE DRAWINGS

Embodiments of the disclosure are illustrated in the figures and will be described in more detail below.

DETAILED DESCRIPTION OF THE PREFERRED EMBODIMENTS

In the following, unless otherwise noted, like reference signs will be used for like and equivalent elements.

Figure 1:
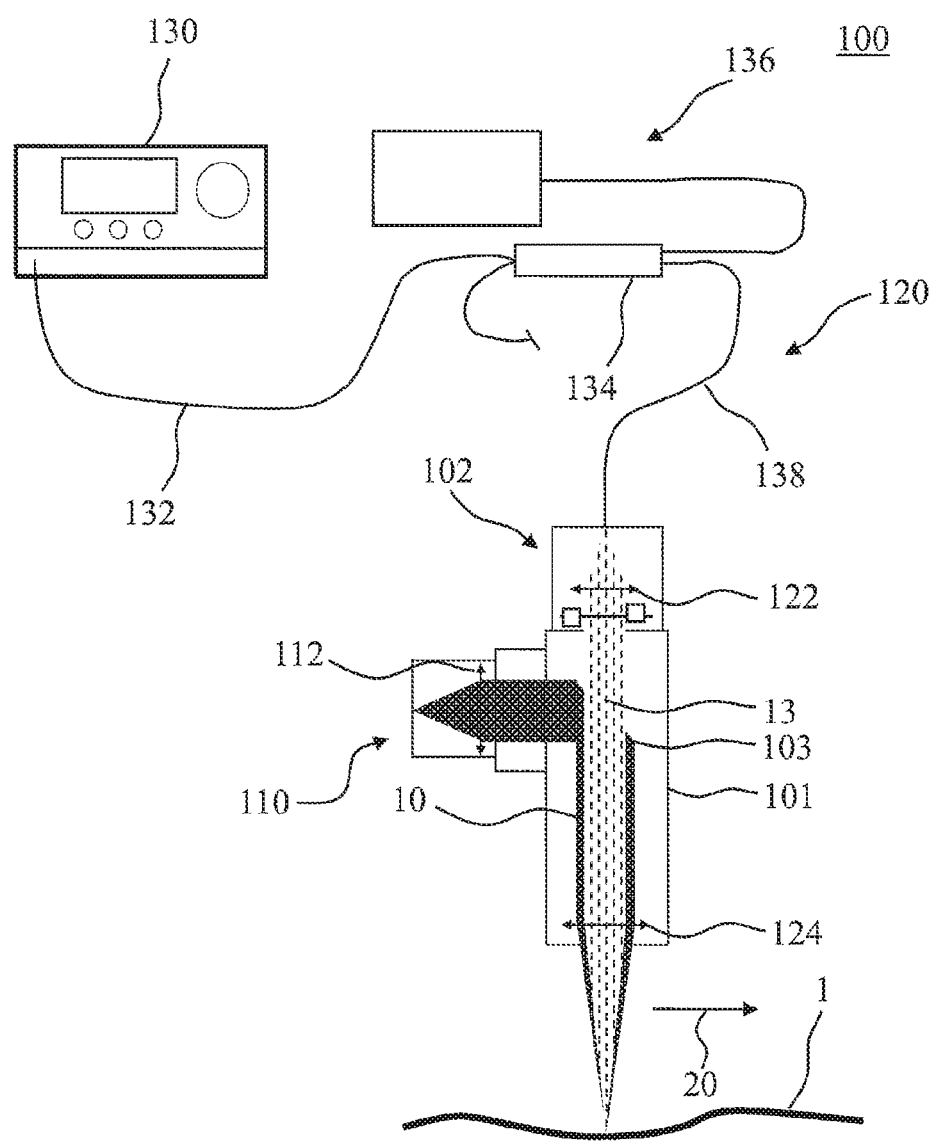
FIG. 1 shows a laser processing system with a processing head according to embodiments of the present disclosure.

FIG. 1 shows a schematic illustration of a laser processing system 100 according to embodiments of the present disclosure. The laser processing system 100 comprises a processing head 101, and in particular a laser cutting or laser welding head.

The laser processing system 100 comprises a laser device 110 for generating a laser beam 10 (also referred to as "processing beam" or "processing laser beam") and a measuring device for measuring a distance between an end section of the processing head 101 and a workpiece 1. The measuring device comprises an optical coherence tomograph 120, and in particular an optical short-coherence tomograph.

The laser device 110 may include a collimator lens 112 for collimating the laser beam 10. Within the processing head 101, the laser beam 10 is deflected by about 90° in the direction of the workpiece 1 by means of a suitable optics 103. The coherence tomograph 120 typically includes a collimator optics 122 configured to collimate an optical measuring beam 13 and a focusing optics 124 configured to focus the optical measuring beam 13 onto the workpiece 1.

In some embodiments, the laser beam 10 and the optical measuring beam 13 may be at least partially coaxial, and, in particular, may be coaxially superposed at least in sections. For example, the coherence tomograph 120 may be configured to couple the optical measuring beam 13 into an optical path of the laser device 110. The merging of the optical measuring beam 13 and the laser beam 10 may take place downstream of the collimator optics 122 and upstream of the focusing optics 124.

In typical embodiments that may be corrected with other embodiments described herein, the collimator optics 122 and the focusing optics 124 are integrated into the processing head 101. For example, the processing head 101 may include a collimator module 102 integrated into the processing head 101 or mounted on the processing head 101. The focusing optics 124 may be a shared focusing optics such as a focusing lens for the laser beam 10 and the measuring beam 13.

According to embodiments, the laser processing system 100 or parts thereof, such as the processing head 101, may be movable along a processing direction 20. The processing direction 20 may be a cutting or welding direction and/or a moving direction of the laser processing system 100 such as the processing head 101 with respect to the workpiece 1. In particular, the processing direction 20 may be a horizontal direction. The processing direction 20 may also be referred to as "feed direction".

In the present disclosure, the distance measurement is based on the principle of optical coherence tomography, which makes use of the coherence properties of light by means of an interferometer. The optical coherence tomograph 120 may include an evaluation unit 130 having a broadband light source (e.g., a superluminescent diode, SLD) which couples the measuring light into an optical waveguide 132. In a beam splitter 134, which preferably has a fiber coupler, the measuring light is split into a reference arm 136 and a measuring arm leading into the processing head 101 via an optical waveguide 138. According to the invention, the reference arm 136 comprises two or more successive reference stages (FIGS. 2 and 3) for increasing the measuring range of the optical coherence tomograph 120.

The optical measuring beam 13 may be directed onto a surface of the workpiece 1, for example. The measuring light reflected back from the surface is mapped onto the inlet/outlet surface of the optical waveguide 138 by the focusing optics 124, superposed with the light reflected back from the referencing arm 136 in the fiber coupler 134, and then directed back into the evaluation unit 130. The superposed light contains information about the path length difference between the reference arm 136 and the measuring arm. This information is evaluated in the evaluation unit 130, whereby the user receives information about the distance between the surface of the workpiece and the processing head 101.

Figure 2:
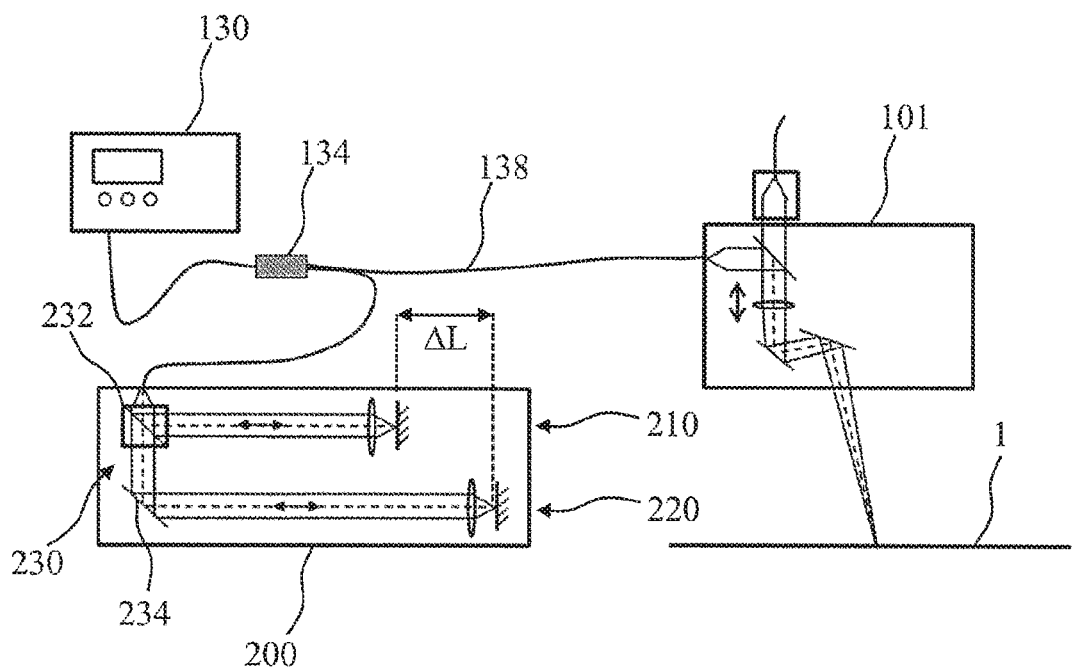
FIG. 2 shows a processing head with an optical coherence tomograph according to embodiments of the present disclosure.

The reference arm according to the invention is described in more detail below with reference to FIGS. 2 and 3. FIG. 2 shows the processing head 101 with the optical coherence tomograph according to embodiments of the present disclosure.

The optical coherence tomograph may be used for optical distance measurements in laser material processing, e.g., for cutting, welding, ablation and additive SLM (Selective Laser Melting) and LMD (Laser Material Deposition) using laser beams. In particular, the field of application of the optical coherence tomograph according to the invention covers processes requiring a large optical measuring range of the OCT measuring system.

The optical coherence tomograph is configured to measure a distance between the processing head 101 and the workpiece 1, wherein measuring light which is generated in the coherence tomograph by a measuring light source and is reflected by the workpiece 1 interferes with measuring light reflected in the reference arm 200 by two or more reference stages. The two or more reference stages comprise a first reference stage 210 configured such that measuring light reflected in the first reference stage 210 travels a first optical path length, and a second reference stage 220 configured such that measuring light reflected in the second reference stage 220 travels a second optical path length different from the first optical path length. The measuring light reflected from the workpiece 1 interferes with the reflected measuring light of the first reference stage 210 and the reflected measuring light of the second reference stage 220. From the interference, the distance between the processing head 101 and the workpiece 1 may be determined.

Typically, the optical path lengths of each reference stage of the two or more reference stages are different. In particular, the optical path lengths of each reference stage may differ by the same path length difference $\Delta L$ or a multiple thereof. With the provision of the two or more reference stages, the effective measuring range of the OCT measuring system is increased by a range depending on the number of reference stages N and the difference in optical path length between two adjacent levels $\Delta L$.

The extension of the measuring range may be specified as $(N-1)*\Delta L$, for example. This formula holds approximately when the path difference is chosen such that there is a small overlap region with the next reference stage, i.e., when $\Delta L$ is slightly smaller than the basic measuring range of the OCT sensor. In this way, it can be ensured that, in the case of a continuous change in the distance of a measurement object in the measuring arm, a stable OCT interference signal emerges from the subsequent reference stage before the interference signal of the preceding reference stage disappears.

In some embodiments, the optical coherence tomograph 220 includes a beam splitter assembly 230 for evenly dividing the measuring light generated by the measuring light source into the two or more reference stages, for example. In particular, the beam splitter assembly 230 may be configured to distribute the measuring light in substantially the same proportions over the two or more reference stages. For example, the measuring light in the reference arm 200 is distributed in equal proportions over the respective optical paths. For two reference stages, the intensity of the measuring light may be 50%, for three reference stages 33%, and so on. As a result, the OCT signal qualities are identical for all reference stages in a distance measurement.

Typically, the beam splitter assembly 230 includes at least one element selected from the group consisting of a reflecting mirror 234, a partially transmissive mirror, a prism assembly 232, and an optical fiber. The beam splitter assembly may comprise multiple copies of one of the elements or any combination of the elements. In the example of FIG. 2, a prism assembly 232 and a reflecting mirror 234 are used to divide the measuring light into the first reference stage 210 and the second reference stage 220, and in particular to divide them evenly.

Figure 3:
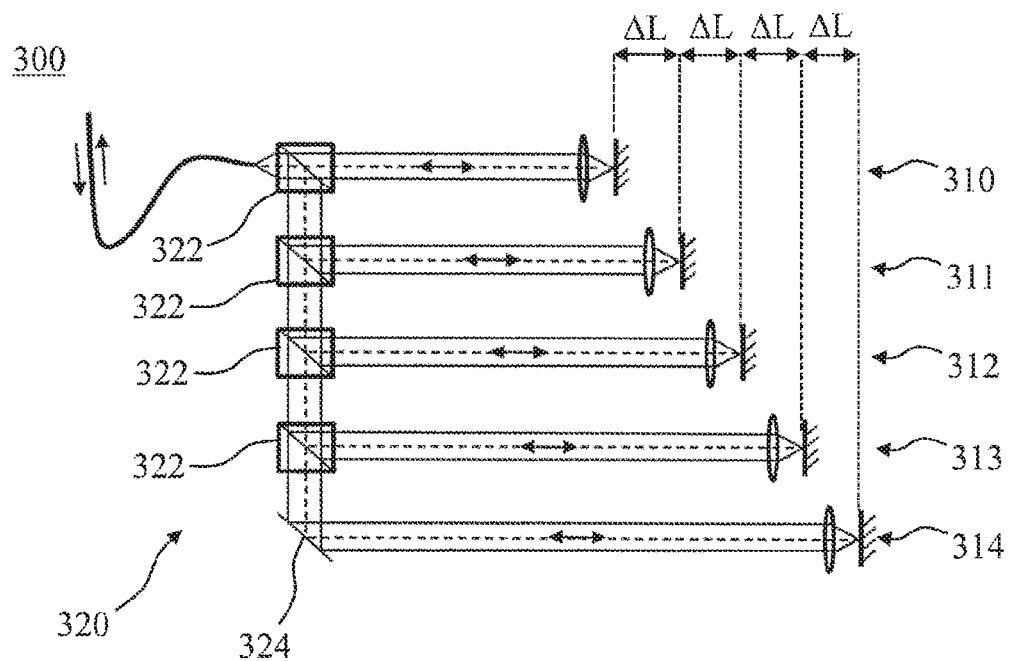
FIG. 3 shows a reference arm of the optical coherence tomograph according to embodiments of the present disclosure.

FIG. 3 shows a reference arm 300 of the optical coherence tomograph according to embodiments of the present disclosure. The reference arm 300 comprises a plurality of reference stages, namely a first reference stage 310, a second reference stage 311, a third reference stage 312, a fourth reference stage 313, and a fifth reference stage 314. A path length difference between adjacent or successive reference stages is indicated by $\Delta L$. The path length difference between adjacent or successive reference stages may be substantially identical for all adjacent reference stages.

In the example of FIG. 3, the division of the measuring light into the individual reference stages is based on a free beam which is reflected back, for example, at an end mirror 324 or a prism or a prism assembly 322 of a beam splitter assembly 320. For example, the two or more reference stages are arranged sequentially, with the beam splitter array 320 having a reflective end mirror 324 at a last reference stage of the two or more reference stages and a prism assembly 322 at each of the remaining reference stages.

In another embodiment (not shown), the division of the measuring light may be implemented by means of fiber technology, wherein the beam splitter assembly comprises a plurality of fiber couplers and a plurality of optical fibers or fiber sections. Here, the measuring light conducted via an optical fiber is split by N fiber couplers into n further optical fibers or fiber sections, so that the measuring light is provided to the individual reference stages. For example, fiber couplers splitting the light into two optical fibers or fiber sections may be used. In order to ensure equal intensities in the reference stages, the measuring light is preferably divided such that it passes the same number of optical fibers and/or fiber couplers for each reference stage. Thus, n*N reference stages can be uniformly illuminated.

The last reference stage may be the reference stage with the longest optical path length for the measuring light. The first reference stage may be the reference stage with the shortest optical path length for the measuring light. The optical path length of the intermediate reference stages may successively increase from the first reference stage to the last reference stage by the path length difference $\Delta L$. For example, the first reference stage may correspond to a first distance range of 0 to 16 mm, the second reference stage to a second distance range of 16 to 32 mm, etc. Thus, the distance ranges corresponding to the individual reference stages or optical path lengths may be equal. The distance ranges may also overlap in order to allow a measurement without gaps and a strong signal as far as possible. For example, a first distance range may be 0 to 16 mm, a second distance range 12 to 28 mm, etc. An overlap of adjacent distance ranges may correspond to approximately 10-25% of the size of the distance ranges. For reference stages with overlapping distance ranges, two or more peaks may appear in the signal. In this case, the evaluation unit may be configured to use the peak corresponding to the smallest distance.

In order to determine the distance from measured values of a reference stage having longer optical path lengths than the first reference stage with the smallest optical path length, a predetermined offset corresponding to a shift of the measuring range or the distance range of this reference stage must be added to the measured values. For example, when a first distance range is 0 to 16 mm and a second distance range is 16 to 32 mm, 16 mm must be added to the measured values of the second reference stage as an offset to determine the distance, because the possible measured values of the reference stages are the same and, in this example, fall between 0 and 16 for all reference stages. If light from the second reference stage interferes with the measuring light reflected from the workpiece and a measured value is determined therefrom, the evaluation unit may be configured to add the predetermined offset corresponding to the second reference stage or the second distance range to the measured value in order to determine the distance. The reference stage from which the light interferes with the measuring light reflected from the workpiece for distance determination may be determined, for example, by knowing an initial distance and the corresponding reference stage and tracking a change in distance. For example, when an initial distance falls within the first distance range of the first reference stage and the distance then increases and falls within the second distance range, the coherence tomograph first detects ascending measured values and then a jump in the measured values towards low values, because as soon as the interference, which is the basis of the distance measurement, comes from the next higher reference stage, the magnitude of the measured values changes to low values of the measured value range. In the example given above, measured values of 0 to 16 mm, which correspond to a distance of 0 to 16 mm, were determined from the first reference stage. If a subsequent measured value of 16 mm changes abruptly to 0 or 1 mm, the interference originates from the adjacent second reference stage and an offset of 16 mm must be added. Alternatively or in addition, the evaluation unit may be configured to determine within which distance range the distance to be measured falls and which reference stage corresponds to this distance range, e.g., by means of a sensor for capacitive or inductive distance measurement, in order to then add the corresponding offset to the measured values. The evaluation unit may receive position data of the processing head from a robot arm controller or position data of one or more scan mirrors from a scanner controller and determine therefrom the relevant distance range and the corresponding reference stage as well as the offset to be added. The offset of the first reference stage or the reference stage with the smallest optical path length may be 0.

Figure 4:
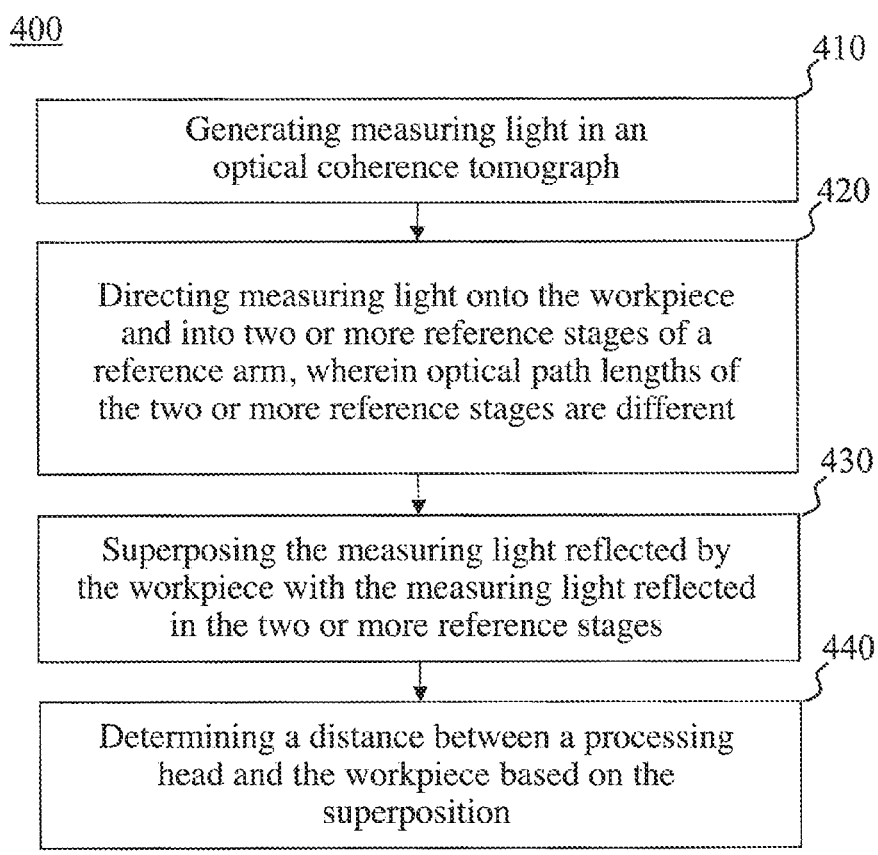
FIG. 4 shows a flowchart of a method for processing a workpiece with a laser beam.

FIG. 4 shows a flowchart of a method 400 for processing a workpiece with a laser beam.

The method 400 comprises generating measuring light in an optical coherence tomograph at block 410, directing the measuring light to the workpiece and two or more reference stages of a reference arm at block 420, wherein optical path lengths of the measuring light in the two or more reference stages are different, superposing the measuring light reflected from the workpiece with the measuring light reflected in the two or more reference stages at block 430, and determining a distance between a processing head and the workpiece based on the superposition at block 440. In particular, the distance may be determined based on an interference of the superposed measuring light. Determining the distance may further comprise adding a predetermined offset to the measured values as described above.

According to the invention, the measuring light of the OCT sensor system is divided into two or more optical path lengths or travel distances of the reference stages in the reference arm. An advantage of this arrangement is that the measuring light from the measuring arm automatically interferes with the portion of the measuring light of a reference stage in the reference arm which has the appropriate optical path length. In particular, this is the case when all reference stages are uniformly illuminated at all times. This eliminates a synchronous and thus complex control of a mechanical element in the reference arm used in the previously known conventional solutions.

The invention claimed is:

1. A laser processing system for processing a workpiece with a laser beam, comprising:
    a processing head; and
    a measuring device for determining a distance between a laser processing head and a workpiece, the measuring device including:
        an optical coherence tomograph configured to determine a distance between the processing head and the workpiece, the optical coherence tomograph comprising;
            a measuring arm for guiding measuring light reflected from the workpiece; and
            a reference arm with N reference stages having different optical path lengths and being subsequently arranged, wherein N is greater than two, the reference arm having a beam splitter assembly for splitting the measuring light into the N reference stages, the beam splitter assembly configured to split the measuring light, in substantially equal parts, and to direct the measuring light onto the N reference stages, wherein the beam splitter assembly comprises a reflecting optical element at a last reference stage of the N reference stages and N-1 semi-transmissive optical elements at the remaining reference stages, wherein each of the semi-transmissive optical elements is configured to split the measuring light such that a part of the measuring light enters the respective reference stage and the other part of the measuring light is guided to the subsequent semi-transmissive optical element of the subsequent reference stage, wherein the reference stages are illuminated equally and at the same time; and
        an evaluation processor unit configured to determine the distance based on a superposition of measuring light from the measuring arm and measuring light from each of the N reference stages.

2. The measuring device according to claim 1, wherein the optical coherence tomograph is configured to superpose the measuring light reflected by the workpiece and the measuring light reflected in the N reference stages.

3. The measuring device according to claim 1, wherein the evaluation processor unit is configured to determine the distance based on an interference between the measuring light reflected by the workpiece and the measuring light reflected in one of the N reference stages.

4. The measuring device according to claim 3, wherein the evaluation processor unit is configured to take into account, for determining the distance, a predetermined offset corresponding to the reference stages in which the measuring light is reflected which interferes with the measuring light reflected by the workpiece.

5. The measuring device according to claim 1, wherein the beam splitter assembly comprises at least one element which is selected from the group consisting of a reflecting optical element, a partially transmissive optical element, a reflecting mirror, a partially transmissive mirror, a prism assembly, and an optical fiber.

6. The measuring device according to claim 1, wherein the beam splitter assembly comprises at least one fiber coupler and at least two fiber sections coupled to the fiber coupler, and wherein the measuring light for each of the N reference stages is provided by a respective fiber section.

7. The measuring device according to claim 1, wherein a path length difference ($\Delta L$) between optical path lengths of successive reference stages of the N reference stages is less than or equal to a measuring range of the coherence tomograph which is dependent on a coherence length of the measuring light.

8. The measuring device according to claim 1, wherein optical path lengths of all of the N reference stages differ by the same path length difference ($\Delta L$).

9. A method for determining a distance between a laser processing head and a workpiece, comprising:
- directing measuring light onto the workpiece and into N reference stages of a reference arm, wherein optical path lengths of the N reference stages are different and wherein N is greater than two, wherein the measuring light is split by a beam splitter assembly of the reference arm, in substantially equal parts, and directed onto the N reference stages, wherein the beam splitter assembly comprises a reflecting optical element at a last reference stage of the N reference stages and N-1 semi-transmissive optical elements at the remaining reference stages, wherein each of the semi-transmissive optical elements splits the measuring light such that a part of the measuring light enters the respective reference stage and the other part of the measuring light is guided to the subsequent semi-transmissive optical element of the subsequent reference stage, wherein the reference stages are illuminated equally and at the same time;
- superposing the measuring light reflected by the workpiece with the measuring light reflected in each of the N reference stages; and
- determining a distance between the processing head and the workpiece based on the superposition.

10. The method of claim 9, wherein the distance is determined based on an interference between the measuring light reflected by the workpiece and the measuring light reflected in one of the N reference stages which has an optical path length corresponding to the distance.

11. A laser processing system for processing a workpiece with a laser beam, comprising:
- a processing head; and
- a measuring device for determining a distance between a laser processing head and a workpiece, the measuring device including:
  - an optical coherence tomograph configured to determine a distance between the processing head and the workpiece, the optical coherence tomograph comprising;
  - a measuring arm for guiding measuring light reflected from the workpiece; and
  - a reference arm with N reference stages having different optical path lengths and being subsequently arranged, wherein N is greater than two, the reference arm having a beam splitter assembly for splitting the measuring light into the N reference stages, the beam splitter assembly configured to split the measuring light, in substantially equal parts, and to direct the measuring light onto the N reference stages, wherein the beam splitter assembly comprises a plurality of successive fiber sections, wherein the measuring light for each reference stage is provided by a respective fiber section, wherein the reference stages are illuminated equally and at the same time; and
- an evaluation processor unit configured to determine the distance based on a superposition of measuring light from the measuring arm and measuring light from each of the N reference stages.

* * * * *